April 13, 1965
C. E. HENDERSHOT
3,178,568
ILLUMINATING DEVICE
Filed March 6, 1963
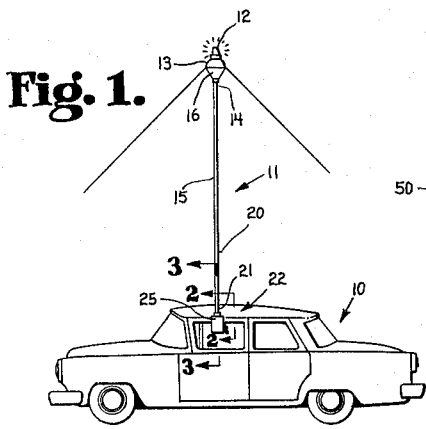
Fig. 1.
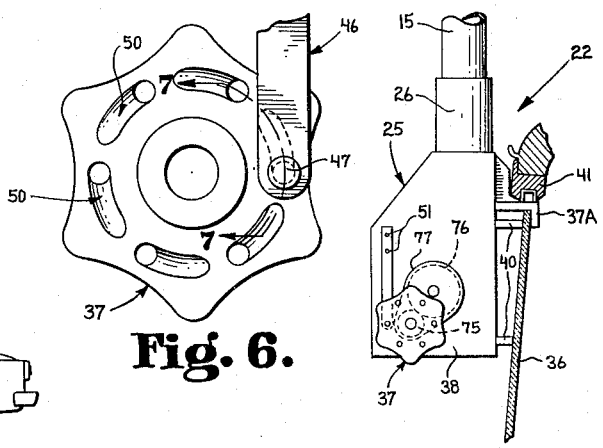
Fig. 6.
Fig. 2.
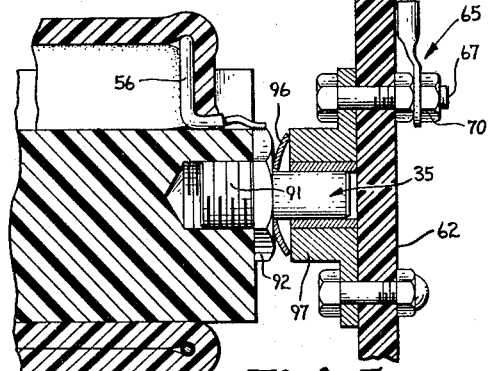
Fig. 5.
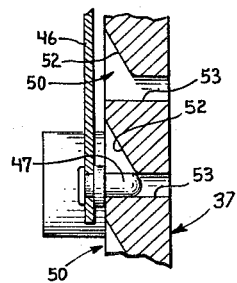
Fig. 7.
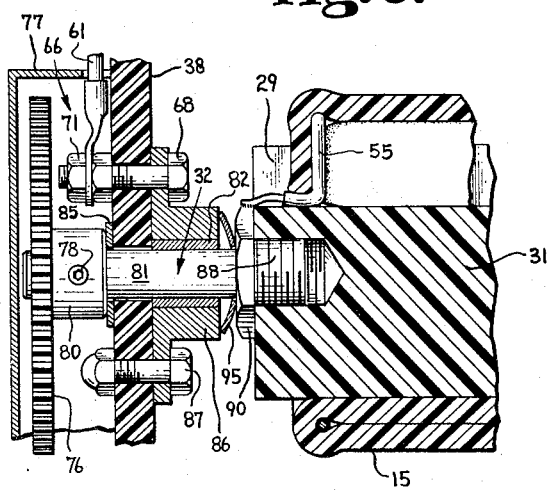
Fig. 4.
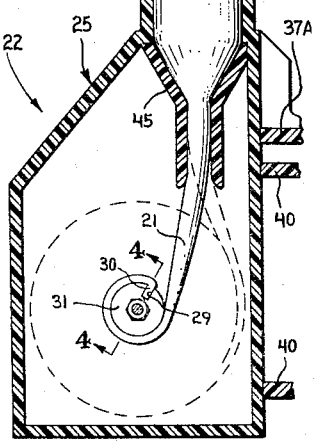
Fig. 3.
INVENTOR.
CHARLES E. HENDERSHOT
BY
Lockwood, Woodard, Smith & Wiikart
Attorneys //www.google.com/patents

United States Patent Office 3,178,568
Patented Apr. 13, 1965

3,178,568
ILLUMINATING DEVICE
Charles E. Hendershot, Nashville, Ind., assignor, by direct and mesne assignments, to Nitehawk, Inc., Zionsville, Ind., a corporation of Indiana
Filed Mar. 6, 1963, Ser. No. 263,251
8 Claims. (Cl. 240—8.18)

The present invention relates to illuminating devices for use in locations where illumination is not normally available, for example, at campsites and at automobile accidents which occur on country roads.

The illuminating device disclosed in my copending application, S.N. 243,324, December 10, 1962, has proven to be particularly desirable not only as a means for illuminating automobile accidents in remote locations but also as a means for illuminating campsites. It has been found, however, that at times a source of compressed air is not readily available for use with the valve 85 disclosed in that application. Also, when the tires of the automobile are used as the compressed air source, an air hose must be connected to the tire valve as well as the valve 85. If this procedure is carried out repeatedly, the air pressure in the tires is reduced so that damage to the tires can result from driving them in under-inflated condition. Also, the connecting air hose is one additional piece of equipment which is desirably eliminated if possible to do so conveniently.

Consequently, one object of the present invention, is to provide an improved illuminating device.

A further object of the invention is to provide an illuminating device which is conveniently inflated so that the illuminating means is rigidly supported in a suitable position where it can thoroughly illuminate a large area.

Another object of the present invention is to provide means for conveniently increasing the air pressure in the flexible inflated container supporting the light source of an illuminating device.

The full nature of the invention will be understood from the accompanying drawings and the following description and claims.

FIG. 1 is a side elevation of an automobile having the illuminating device of the present invention mounted thereon.

FIG. 2 is an enlarged vertical section taken along the line 2—2 of FIG. 1 in the direction of the arrows.

FIG. 3 is an enlarged vertical section taken along the line 3—3 of FIG. 1 in the direction of the arrows and showing certain internal construction details.

FIG. 4 is an enlarged section taken along the line 4—4 of FIG. 3 is the direction of the arrows.

FIG. 5 is also an enlarged section taken along the line 4—4 of FIG. 3 in the direction of the arrows.

FIG. 6 is an enlarged view of the rear face of a handle illustrated in FIG. 2 also showing certain associated operating structure.

FIG. 7 is a section taken along the line 7—7 of FIG. 6 in the direction of the arrows.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring more particularly to the drawings, there is illustrated an automibile 10 which may be, for example, a police car. In the description which follows, the invention is assumed to be used as an accident illuminating device. However, it will be obvious that the invention has other applications such as, for example, the illumination of camp sites. The illuminating device 11 of FIG. 1 includes a red blinker light 12 and a reflector 13 both of which are mounted on one end 14 of a flexible inflatable tube-like container 15. Also mounted upon the container 15 is a light source 16 which may be, for example, a 12 or 6 volt bulb or bulbs or may be a higher voltage bulb. In the case the bulb is a higher voltage bulb, the higher voltage is supplied through a vibrator transformer system as disclosed on page 16 of my above mentioned copending application. The red blinker 12 is provided with a blinker bulb which turns on and off at a desired rate in response to a constant voltage identical to that supplied to the light 16.

The inflatable container 15 is inflated by a conventional, commercially available, manually operated valve 20. It can be easily and conveniently opened in order to permit the placing of the mouth thereon and the filling of the container with air by the use of lung power. The container 15 need not be filled to any very great pressure for reasons that will become evident below.

The elongated tube 15 is formed of commercially available flexible tubular material which can include an internal rubber or plastic layer and an external fabric layer. Thus, the tube is not elastic but is instead flexible and when inflated to sufficient pressure, assumes stiff and rigid cylindrical shape rather than expanding as does a toy balloon. The other end 21 of the container 15 is secured to and supported by an assembly 22 which includes a housing 25 formed of electrical insulating material. At the upper end of the housing, there is formed a cylindrical portion 26, the internal surface 27 of which has a cylindrical shape corresponding to the external surface of the container 15 when fully inflated. The end 21 of the container 15 is glued at 30 within a slot 29 of a spool 31 which is formed of electrical insulating material such as plastic and is rotatably mounted by shafts 32 and 35 to the housing 25.

After the tube has been inflated to a relatively low pressure by the use of lung power, the valve 20 is closed and the apparatus is supported upon the window 36 of the automobile. Secured to the housing 25 is a hook 37A and spacers 40. After the hook 37A has been placed over the window, the window can be rolled up causing the hook 37A to be clamped between the window opening defining member 41 and the window 36.

The pressure of the air within the container 15 is then increased in order to make the container stand rigidly erect. This effect is accomplished by rotation of a handle 37 rotatably mounted upon the wall 38 of the housing 25. The spool 31 is rotated by the rotation of the handle 37 causing the container 15 to be pulled downwardly through the cylindrical portion 26 and through a tapering portion 45. As the tube 15 moves through the tapering portion and is wound onto the spool 31, it is squeezed together so that the space within the container at the point being squeezed is much less than, for example, the space within the container higher up in the tube. This effect causes reduction of volume and an increase of the air pressure within the tube.

Referring to FIGS. 2, 6 and 7, the handle 37 is provided with a spring arrangement 46 which acts as a ratchet for the device. The spring 46 has a projecting member 47 secured thereto, said member 47 extending into recesses 50 in the rearward face of the handle 35. The spring 46 is secured at its upper end to the housing 25 by two screws 51 which cause the spring 46 to always maintain the same angle of attachment relative to the housing 25.

The various recesses 50 are tapered at 52 and extend completely through the handle at 53. When the handle is rotated to wrap the container 15 about the spool 31, the member 47 does not resist rotation of the handle since the member is cammed against the surfaces 52. On the other hand, when the handle 37 is released, the container 15 tends to rotate the handle to release the pressure in the tube. However, rotation is resisted by engagement of the member 47 with the surfaces 53 of the recesses 50.

The electrical voltage supplied to the lights 16 and 12 is supplied through the wires 55 and 56, these wires extending through the inside of the container 15. The power for the present apparatus can be supplied directly from the cigarette lighter socket or possibly from the cigarette lighter through the vibrator transformer system mentioned above and which may be mounted at any desired location. Thus, electricity at the desired voltage is supplied to the illustrated structure through the wires 60 and 61 which are secured to the housing 25 at the opposite side walls 62 and 38 thereof. The wires 60 and 61 are secured to terminals 65 and 66 which include bolts 67 and 68 secured to the walls 62 and 38 and additional nuts 70 and 71. Preferably the walls 62 and 38 are formed of plastic insulating material so that there is no short between the terminals 65 and 66.

The handle 37 is operatively and positively connected to the spool 31 through a pair of spur gears 75 and 76, the spur gear 75 being keyed or fixed to the shaft rotatably mounting the handle upon the housing wall 38 and the spur gear 76 being fixed to the shaft 32 by a setscrew 78. Both of the spur gears 75 and 76 are received within a housing 77 fixed to the wall 38 of the main housing 25.

The shaft 32 has a reduced portion 81 rotatably received within the bearing 82. A washer 85 also surrounds the reduced portion 81 of the member 32 and acts as a bearing between the cylindrical portion 80 of the spur gear and the wall 38 of the housing 25. The bearing 82 is received within an annular member 86 fixed to the inside of the wall 38 by the bolt 87 and the terminal providing bolt 68.

As mentioned, the member 32 rotatably mounts the spool 31. The member 32 has an enlarged threaded portion 88 which is received within the end of the spool 31 and is locked thereto by a nut 90. The opposite end of the spool 31 is similarly rotatably mounted upon the housing 25 by the member 35 which has an enlarged portion 91 threadedly received within the end of the spool. The nut 92 functions similarly to the nut 90 to lock the member 35 in position.

The wires 55 and 56 are soldered respectively to the nuts 90 and 92 which are formed of electrically conductive material. A pair of spring washers 95 and 96 are received between the nuts 90 and 92 and the bearing supports 86 and 97. Both of the bearing supports 86 and 97 are formed of electrically conductive material and contact respectively the bolts 68 and 67 of the terminals 66 and 65.

It can be appreciated that even though the spool 31 rotates, a constant electrical connection is provided between the nuts and the bearing supports. Furthermore, the spring washers function to separate and position the spool so that it is not loosely received upon the mounting supports 86 and 97.

From the above description, it will be evident that the present invention provides an improved illuminating device. It will also be evident that the present invention provides an illuminating device which is conveniently inflated so that the illuminating means is rigidly supported in a suitable position where it can thoroughly and completely illuminate a large area. It will also be evident that the present invention provides means for conveniently increasing the air pressure in the flexible inflated container supporting the light source of an illuminating device.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. An illuminating device comprising an elongated flexible container, said container being fluid inflated into a rigid elongated shape, a light mounted on said container, means for supporting said container, said means having a rigid configuration the same as the inflated shape of said container and engaging said container, and means for squeezing said container at one portion thereof and for retaining said portion in squeezed condition for forcing said fluid out of said one portion of said container into another portion thereof whereby said container is more firmly supported by said supporting means.

2. In an illuminating device including an elongated flexible container, said container being fluid-inflated into a rigid elongated shape and a light mounted on said container; the improvement which comprises means for supporting the container, said means comprising a housing, a spool rotatably mounted on said housing, said container having one end secured to said spool, said housing having a portion with the same shape and engaging said inflated container, and means for locking said spool relative to said housing when a portion of said container is wrapped on said spool.

3. In an illuminating device including an elongated flexible container, said container being fluid inflated into a rigid elongated shape, and a light mounted on one end of said container, the improvement which comprises means supporting the container adjacent its other end, said means comprising a housing, a spool rotatably mounted upon and within said housing, a handle rotatably mounted on said housing and positioned outside of said housing, said handle being operatively connected to said spool, an annular element fixed to said housing and extending outside thereof, said element having the same inside shape as said rigid elongated shape, a guide fixed to the inside of said housing and extending toward said spool, said container having its other end secured to said spool and extending through said guide and annular shaped element in engagement therewith, and a ratchet mechanism normally permitting rotation of said handle to wrap said container on said spool but blocking rotation of said handle in the opposite direction, said ratchet mechanism being operable to permit rotation of said handle in both directions.

4. In an illuminating device including an elongated flexible container, said container being fluid inflated into a rigid elongated shape, and a light mounted on one end of said container, the improvement which comprises means supporting the container adjacent its other end, said means comprising a housing, a spool rotatably mounted upon and within said housing, a handle rotatably mounted on said housing and positioned outside of said housing, said handle being operatively connected to said spool, an annular element fixed to said housing and extending outside thereof, said element having the same inside shape as said rigid elongated shape, a guide fixed to the inside of said housing and extending toward said spool, said guide including two spaced guide elements which taper toward one another from said housing and are then parallel to one another for a portion of their extent, said container having its other end secured to said spool and extending through said guide and annular shaped element in engagement therewith, and a ratchet mechanism normally permitting rotation of said handle to wrap said container on said spool but blocking rotation of said handle in the opposite direction, said ratchet mechanism being operable to permit rotation of said handle in both directions.

5. In an illuminating device including an elongated flexible container, said container being fluid inflated into a rigid cylindrical elongated shape, and a light mounted on one end of said container, the improvement which comprises means supporting the container adjacent its other end, said means comprising a housing, a spool rotatably mounted upon and within said housing, a handle rotatably mounted on said housing and positioned outside of said housing, said handle being operatively connected by a positive drive to said spool, a cylindrically shaped element fixed to said housing and extending outside thereof, said element having the same inside diameter as said rigid cylindrical elongated shape, a guide fixed to the inside of said housing and extending toward said spool, said guide including two spaced guide elements which taper toward one another from said housing and are then parallel to one another for a portion of their extent, said container having its other end secured to said spool and extending through said guide and cylindrically shaped element in engagement therewith, and a ratchet mechanism normally permitting rotation of said handle to wrap said container on said spool but blocking rotation of said handle in the opposite direction, said ratchet mechanism being operable to permit rotation of said handle in both directions.

6. In an illuminating device including an elongated flexible container, said container being fluid inflated into a rigid cylindrical elongated shape, and a light mounted on one end of said container, the improvement which comprises means supporting the container adjacent its other end, said means comprising a housing, a spool rotatably mounted upon and within said housing, a handle rotatably mounted on said housing and positioned outside of said housing, said handle being operatively connected by a positive drive to said spool, the operative connection between said spool and handle being stepped down in such a manner that less torque is required to rotate said handle than is exerted by said spool, a cylindrically shaped element fixed to said housing and extending outside thereof, said element having the same inside diameter as said rigid cylindrical elongated shape, a guide fixed to the inside of said housing and extending toward said spool, said guide including two spaced guide elements which taper toward one another from said housing and are then parallel to one another for a portion of their extent, said container having its other end secured to said spool and extending through said guide and cylindrically shaped element in engagement therewith, and a ratchet mechanism normally permitting rotation of said handle to wrap said container on said spool but blocking rotation of said handle in the opposite direction, said ratchet mechanism being operable to permit rotation of said handle in both directions.

7. In an illuminating device including an elongated flexible container, said container being fluid inflated into a rigid cylindrical elongated shape, and a light mounted on one end of said container, the improvement which comprises means supporting the container adjacent its other end, said means comprising a housing, a spool rotatably mounted upon and within said housing, a handle rotatably mounted on said housing and positioned outside of said housing, said handle being operatively connected by a positive drive to said spool, the operative connection between said spool and handle being stepped down in such a manner that less torque is required to rotate said handle than is exerted by said spool, a cylindrically shaped element fixed to said housing and extending outside thereof, said element having the same inside diameter as said rigid cylindrical elongated shape, a guide fixed to the inside of said housing and extending toward said spool, said guide including two spaced guide elements which taper toward one another from said housing and are then parallel to one another for a portion of their extent, said container having its other end secured to said spool and extending through said guide and cylindrically shaped element in engagement therewith, a ratchet mechanism normally permitting rotation of said handle to wrap said container on said spool but blocking rotation of said handle in the opposite direction, said ratchet mechanism being operable to permit rotation of said handle in both directions, and a hook and bracket means secured to said housing for mounting said housing upon the window of an automobile.

8. In an illuminating device including an elongated flexible container, said container being fluid inflated into a rigid cylindrical elongated shape, and a light mounted on one end of said container, the improvement which comprises means supporting the container adjacent its other end, said means comprising a housing, a spool rotatably mounted upon and within said housing, a handle rotatably mounted on said housing and positioned outside of said housing, said handle being operatively connected by a positive drive to said spool, the operative connection between said spool and handle being stepped down in such a manner that less torque is required to rotate said handle than is exerted by said spool, a cylindrically shaped element fixed to said housing and extending outside thereof, said element having the same inside diameter as said rigid cylindrical elongated shape, a guide fixed to the inside of said housing and extending toward said spool, said guide including two spaced guide elements which taper toward one another from said housing and are then parallel to one another for a portion of their extent, said container having its other end secured to said spool, a ratchet mechanism normally permitting rotation of said handle to wrap said container on said spool but blocking rotation of said handle in the opposite direction, said ratchet mechanism being operable to permit rotation of said handle in both directions, means extending through said container and housing for providing electrical power to said light, and a hook and bracket means secured to said housing for mounting said housing upon the window of an automobile.

References Cited by the Examiner
UNITED STATES PATENTS

| | | | |
|---|---|---|---|
| 2,212,128 | 8/40 | Richter | 73—418 X |
| 2,324,614 | 7/43 | Dalton. | |
| 2,738,492 | 3/56 | Arneson et al. | 240—7.1 X |
| 2,861,268 | 11/58 | Tinsley | 343—902 |

NORTON ANSHER, *Primary Examiner.*